Figure 1:
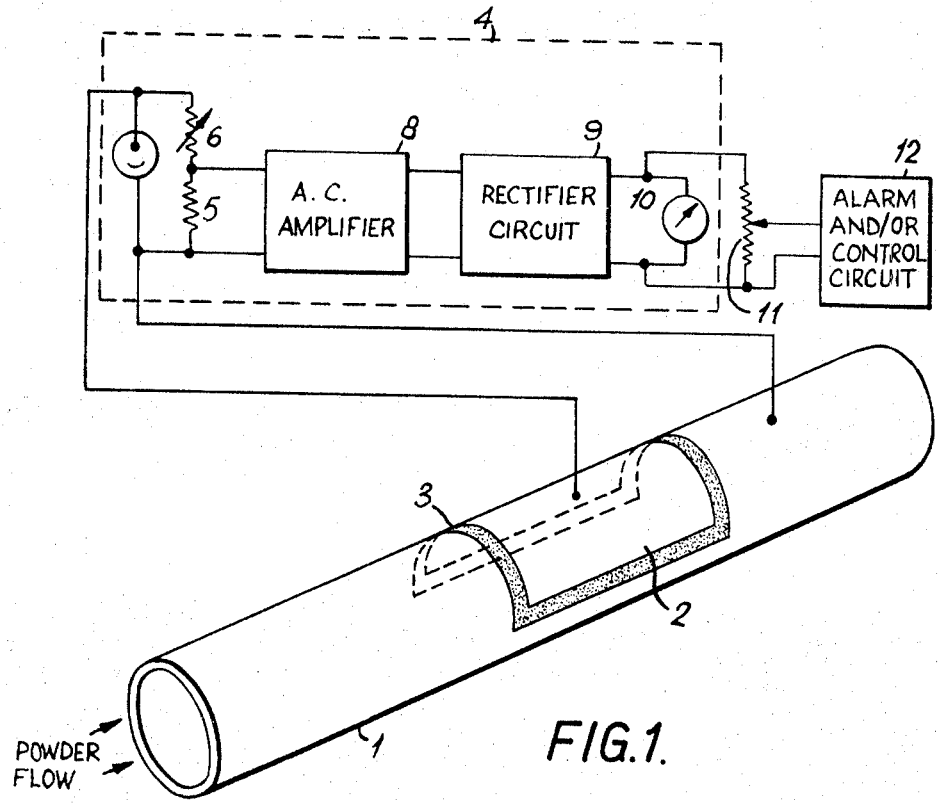

United States Patent [19]
Beck

[11] 3,753,102
[45] Aug. 14, 1973

[54] DETECTION OF ELECTROSTATIC CHARGE IN FLOWING MATERIALS

[75] Inventor: Maurice Sidney Beck, Bradford 9, Yorkshire, England

[73] Assignee: National Research Development Corporation, London, England

[22] Filed: Dec. 11, 1970

[21] Appl. No.: 97,182

[30] Foreign Application Priority Data
Dec. 15, 1969 Great Britain................... 61,040/69

[52] U.S. Cl..................... 324/109, 324/32, 324/72, 340/236
[51] Int. Cl. .......................... G01r 5/28, G01r 29/12
[58] Field of Search....................... 324/109, 32, 72; 310/7; 73/194 E; 317/2, 3, 262; 137/2; 340/240, 236, 239

[56] References Cited
UNITED STATES PATENTS
| | | |
|---|---|---|
| 2,315,805 | 4/1943 | Mayo et al.............................. 317/2 |
| 2,909,190 | 10/1959 | Wilson.................................... 317/2 |
| 3,453,538 | 7/1969 | Wright et al.......................... 324/72 |
| 3,368,144 | 2/1968 | Gerdes.................................... 324/32 |
| 2,827,577 | 3/1958 | Kimberlin, Jr. et al............. 310/7 X |
| 2,491,445 | 12/1949 | Cunningham et al............. 324/32 X |
| 2,909,190 | 10/1959 | Wilson............................. 324/32 X |

FOREIGN PATENTS OR APPLICATIONS
701,955  1/1954  Great Britain....................... 324/72

Primary Examiner—Rudolph V. Rolinec
Assistant Examiner—Ernest F. Karlsen
Attorney—Cushman, Darby and Cushman

[57] ABSTRACT

Electrostatic charge is detected in a turbulently flowing material by arranging an electrode so that there is induced on it a potential dependent on the charge concentration in the material, and sensing the magnitude of the alternating component of the induced potential due to the turbulence.

12 Claims, 2 Drawing Figures

PATENTED AUG 14 1973          3,753,102

DETECTION OF ELECTROSTATIC CHARGE IN FLOWING MATERIALS

It is known that electrostatic charge may be generated during the flow of various materials, and this may lead to an explosion or fire hazard if the charge accumulates, for example in a container into which the flowing material is fed. The charge generation may occur because of the inherent nature of the flowing material, as in the case of the pneumatic conveyance of particulate materials such as flour or cement, or because of the presence of a contaminant in the flowing material, for example water in a petroleum liquid.

In order to assess the degree of risk involved in any particular case, it may be desired to provide a means for measuring the electrostatic charge concentration either in the flowing material or in a container into which this material discharges. A known form of instrument which could be used for this purpose comprises a highly insulated electrode which is arranged so that there is induced on it a potential dependent on the electrostatic charge concentration to be measured, and a d.c. voltmeter for measuring the induced potential. This form of instrument is, however, subject to gross inaccuracies because of leakage resistance variations, particularly when used in an industrial context.

The present invention is based on the realisation that in the case of a turbulently flowing material much greater accuracy can be achieved in the measurement of electrostatic charge concentration if, instead of directly measuring its mean value by means of a d.c. technique, one senses the random fluctuations due to the turbulence by means of an a.c. technique. It will be appreciated that the flow will normally be of a turbulent nature in cases in which there is a high rate of charge generation giving rise to a significant explosion or fire risk.

Thus according to the invention there is provided apparatus for detecting electrostatic charge in a turbulently flowing material, comprising an electrode associated with a conduit for the material so that there will be induced on the electrode a potential dependent on the electrostatic charge concentration in the material flowing through the conduit, and means responsive to the magnitude of the alternating component of the induced potential due to the turbulence.

This alternating component has a character similar to band-limited white noise, and it can be shown that its magnitude is dependent on the mean value of the electrostatic charge concentration and the mean velocity of flow. Where the latter is constant, as will commonly be the case in situations in which such an apparatus is used, the magnitude of the alternating component will give a direct measure of the mean value of the electrostatic charge concentration.

The apparatus may be arranged to give an indication of the magnitude of the alternating component; it may also, or instead, be arranged to operate an alarm and/or a control in response to the occurrence of a value of the magnitude of the alternating component exceeding a predetermined value.

The invention further provides a method of detecting electrostatic charge in a turbulently flowing material, comprising causing the material to flow past an electrode so that there is induced on the electrode a potential dependent on the electrostatic charge concentration in the material, and deriving a signal representative of the magnitude of the alternating component of the induced potential due to the turbulence.

Figure 2:
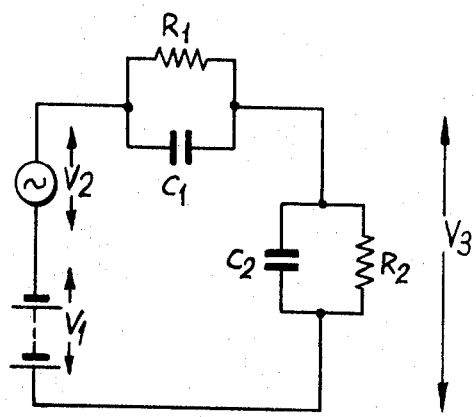

One arrangement in accordance with the invention will be described by way of example with reference to the accompanying drawings, in which:

FIG. 1 is a diagrammatic representation of an apparatus for detecting electrostatic charge in a powdered material transported along a pneumatic conveyor; and FIG. 2 is a diagram of the equivalent circuit of the apparatus of FIG. 1.

The conveyor is arranged to discharge the powder into a hopper, and the charge detection apparatus is provided in order to obtain a continuous assessment of the risk of an explosion in the hopper due to charging of the powder in the conveyor. Referring to FIG. 1, the conveyor has a tubular metal wall 1 a portion of which is cut away to form a semi-cylindrical aperture near the outlet of the conveyor. In the aperture is disposed an electrode 2 in the form of a semi-cylindrical metal sheet conforming in shape with the wall 1, the dimensions of the electrode 2 being such as to leave between it and the wall 1 a gap about 3 mm. wide which is filled with a suitable dielectric material 3 to insulate the electrode 2 from the wall 1.

In operation a potential is induced on the electrode 2 relative to the wall 1, due to the electrostatic charge on the powder flowing through the conveyor. In normal operation the flow is at a high velocity such that considerable turbulence occurs, the mean air velocity (and hence the mean particle velocity) along the length of the conveyor being substantially constant. As a result the induced potential consists of a unidirectional component whose magnitude is dependent on the mean electrostatic charge concentration in the vicinity of the electrode 2, and an alternating component, due to the turbulence and having the character of noise, whose magnitude is also dependent on the mean electrostatic charge concentration in the vicinity of the elecrode 2; typically the R.M.S. value of the alternating component may be about 30% of the magnitude of the unidirectional component.

The magnitude of alternating component is measured by means of an a.c. voltmeter 4. The voltmeter 4 comprises an input potential divider consisting of resistors 5 and 6, which may be shunted by a neon tube 7 serving to bypass any voltage surges due to sparking to the electrode 2, the resistor 6 being variable to adjust the sensitivity of the voltmeter 4; the resistor 5 may suitably have a value of 10 megohms, and the resistor 6 a maximum value of 100 megohms. The alternating component of the voltage appearing across the resistor 5 is amplified by an a.c. amplifier 8 having a pass-band of 1–4000 Hz. and designed to have a high input impedance (say greater than 1 megohm) over this frequency band. The output of the amplifier 8 is rectified by a circuit 9, and the rectified output is applied to a d.c. meter 10 whose reading gives an indication of the electrostatic charge concentration at the outlet of the conveyor.

The relationship between the reading of the meter 10 and the explosion risk for a given powder at a given velocity can be determined empirically by feeding the output of the conveyor into a vessel where charge may be accumulated under "worst-case" conditions. The powder and the conveying air should be dry in order to generate sufficient charge to lead to an explosion in the test vessel, the contents of which should be agitated by dry compressed air.

The output from the rectifier circuit 9 is also applied via a variable potentiometer 11 to a circuit 12 incorporating a trigger circuit set to operate when the input voltage exceeds a predetermined level corresponding to a desired safety factor in respect of the explosion risk. Operation of the trigger circuit is arranged to acutate an alarm and/or an automatic control for stopping the flow of the powder through the conveyor or for humidifying the air in the conveyor. The rectifier circuit 9 is arranged to have a smoothing time constant of about five seconds, so that short term irregularities in the charge concentration in the conveyor will not cause false operation of the circuit 12 or unsteady readings of the meter 10.

The equivalent circuit of the apparatus described above is shown in FIG. 2, in which $V_1$ and $V_2$ respectively represent the unidirectional and alternating components of the voltage generated by the charge, $C_1$ and $C_2$ respectively represent the effective mean capacitance between the powder and the electrode 2 and the capacitance between the electrode 2 and the wall 1, $R_1$ represents the composite effect of the charge transmitted through the air by direct leakage and the charge transmitted by charged particles striking the electrode 2, and $R_2$ represents the combined effect of the leakage resistance associated with the capacitance $C_2$ and the input resistance of the voltmeter 4. It will be seen that for a given magnitude of $V_2$, the magnitude of the alternating component of the voltage $V_3$ appearing across the capacitance $C_2$ will depend on the values of $C_1$, $C_2$, $R_1$ and $R_2$. At frequencies sufficiently high for the impedances of the capacitances $C_1$ and $C_2$ to be small respectively compared with the resistances $R_1$ and $R_2$, which will be the case over the whole or nearly the whole of the pass-band of the amplifier 8, the presence of the resistances $R_1$ and $R_2$ can be ignored, so that the measurement accuracy will depend simply on the values of the capacitances $C_1$ and $C_2$. The value of $C_2$ is inherently stable, while the value of $C_1$ will be stable where the mean particle density is uniform over the cross-section of the conveyor, or where the density distribution does not vary with time even if it is non-uniform.

This situation may be contrasted with the use of an instrument of the known form referred to above, which would involve replacement of the voltmeter 4 by a d.c. voltmeter with a view to measuring the voltage $V_1$. In this case the capacitances $C_1$ and $C_2$ need not be taken into account, so that the measurement accuracy would be dependent solely on the values of the resistances $R_1$ and $R_2$. Since $R_1$ can vary with atmospheric humidity, and $R_2$ is low compared with $R_1$, and can vary both with atmospheric humidity and the state of cleanliness of the insulation of the measuring electrode, the measurement in this case would be liable to serious errors.

It will be appreciated that the invention is not limited in its application to gas/solid systems, as in the apparatus described by way of example, but is equally applicable to systems in which the flowing material includes a liquid phase.

I claim:

1. Apparatus for use with a conduit carrying a turbulently flowing material for detecting electrostatic charge therein, comprising an electrode associated with the conduit for the material so that there will be induced on the electrode a potential dependent on the electrostatic charge concentration in the material flowing through the conduit, and means responsive to the magnitude of an alternating component of the induced potential said alternating component being due to the turbulence and having a maximum frequency characteristic of the audio frequency range.

2. Apparatus according to claim 1, in which the conduit is a pneumatic conveyor.

3. Apparatus for detecting electrostatic charge generated in a turbulently flowing material comprising:
   a conduit for carrying the flow of said material;
   an electrode associated with said conduit and in intimate contact with the flowing material wherein there is induced on the electrode a potential having direct and alternating components dependent upon the magnitude of the electrostatic charge concentration in the, material, the latter induced as a result of the turbulent flow of material through the conduit; and
   means responsive to the magnitude of the alternating component of the induced potential due to the turbulence for producing an output dependent thereon.

4. Apparatus accoding to claim 3 wherein said conduit comprises a pneumatic conveyor.

5. Apparatus according to claim 4 wherein said pneumatic conveyor is a cylindrical member having an aperture therein and said electrode is disposed so as to seal said aperture and dielectric member is disposed between said electrode and said cylindrical member for insultaing one from the other.

6. Apparatus for detecting electrostatic charge in a turbulently flowing material, the apparatus comprising:
   an electrode associated with a conduit for the flowing material so as to be exposed in a substantially invariant manner to the influence of electrostatic charge in material flowing through said conduit, whereby when material containing electrostatic charge flows unidirectionally through said conduit in a turbulent manner therewill be induced on said electrode a potential dependent on the electrostatic charge concentration and having both a direct component and a randomly fluctuating component the latter due to he turbulence; and
   means responsive to the magnitude of said randomly fluctuating component of the induced potential at no greater than the audio frequency range.

7. A method of detecting electrostatic charge in a flowing material, the method comprising:
   causing the material to flow unidirectionally in a turublent manner past an electrode which is exposed in a substantially invariant manner to the influence of electrostatic charge in the flowing material, whereby there is induced on said electrode a potential dependent on the electrostatic charge concentration and having both a direct component and a randomly fluctuating component the latter component due to the turbulence; and
   deriving a signal representative of the magnitude of said randomly fluctuating component of the induced potential.

8. A method according to claim 7, in which the flowing material is a pneumatically conveyed particulate material.

9. Apparatus for detecting an electrostatic charge existent in a turbulently flowing material, comprising:

an electrode, a conduit associated therewith for carrying the flowing material unidirectionally therethrough, said electrode exposed to the influence of said electrostatic charge in the material in a substantially invariant manner, and said electrostatic charge inducing on said electrode a potential dependent upon charge concentration thereof, said potential exhibiting both a direct component and a randomly fluctuating component the latter component due to the turbulence; and means responsive to the magnitude of said randomly fluctuating component of the induced potential for producing an output indicative thereof.

10. A method of detecting electrostatic charge in a material, the method comprising:

generating a flow of the material unidirectionally in a turbulent manner;

exposing an electrode to said flow in a substantially invariant manner to the influence of electrostatic charge in said material, measuring an induced electric potential in said electrode in accordance with the concentration of said electrostatic charge said potential having both a direct component and an alternating component, the latter due to the turbulence, deriving a signal having a magnitude representative of the randomly fluctuating component of said induced potential.

11. The apparatus according to claim 1, wherein the frequency of the alternating current component is up to about 4,000 Hz.

12. The apparatus according to claim 6 wherein the frequency of the alternating current component is up to about 4,000 Hz.

* * * * *